(12) United States Patent
Kitamura

(10) Patent No.: US 6,857,975 B2
(45) Date of Patent: Feb. 22, 2005

(54) ROTATION DIRECTION DETECTION APPARATUS

(75) Inventor: Satoshi Kitamura, Kitakatsuragi-gun (JP)

(73) Assignee: Shimano, Inc., Osaka (JP)

( * ) Notice: Subject to any disclaimer, the term of this patent is extended or adjusted under 35 U.S.C. 154(b) by 137 days.

(21) Appl. No.: 10/341,395

(22) Filed: Jan. 14, 2003

(65) Prior Publication Data

US 2004/0138017 A1 Jul. 15, 2004

(51) Int. Cl.$^7$ .......................... F16H 63/44; F16H 7/08; G01L 3/10
(52) U.S. Cl. .......................... 474/70; 474/80; 474/102; 180/171; 702/44
(58) Field of Search .............................. 474/78–82, 70, 474/160; 280/259, 288; 180/205, 171, 256; 702/44; 324/166, 174; 340/671

(56) References Cited

U.S. PATENT DOCUMENTS

| | | | | |
|---|---|---|---|---|
| 3,898,563 A | * | 8/1975 | Erisman | 324/166 |
| 4,308,665 A | * | 1/1982 | Losch | 33/781 |
| 4,331,918 A | * | 5/1982 | Dunch | 340/671 |
| 4,430,800 A | * | 2/1984 | Shimano | 33/772 |
| 4,434,801 A | * | 3/1984 | Jiminez et al. | 280/288.4 |
| 4,966,380 A | * | 10/1990 | Mercat | 280/259 |
| 5,027,303 A | * | 6/1991 | Witte | 73/379.06 |
| 5,065,633 A | * | 11/1991 | Mercat | 73/862.326 |
| 5,254,044 A | * | 10/1993 | Anderson | 474/70 |
| 5,788,007 A | * | 8/1998 | Miekka | 180/205 |
| 5,900,703 A | * | 5/1999 | Li | 74/502.2 |
| 6,199,021 B1 | * | 3/2001 | Cote et al. | 702/44 |
| 6,659,895 B2 | * | 12/2003 | Fukuda | 474/70 |

FOREIGN PATENT DOCUMENTS

| | | | | |
|---|---|---|---|---|
| JP | 08-301175 A | * | 11/1969 | B62M/23/02 |
| JP | 09-297077 A | * | 11/1997 | B62M/23/02 |
| JP | 2000-193540 A | * | 7/2000 | G10L/3/10 |

* cited by examiner

Primary Examiner—Marcus Charles
(74) Attorney, Agent, or Firm—Shinjyu Global IP Counselors, LLP

(57) ABSTRACT

A rotation direction detection apparatus is configured to detect the direction of rotation of a pulley that is rotatably mounted to a chain guide, and includes a rotation sensor, a detection element and a shielding mechanism. The rotation sensor is fixed to the chain guide. The detection element is mounted to the pulley such that it can be detected by the rotation sensor. The shielding mechanism has a shielding arm that is mounted to move between a shielding position where the rotation sensor cannot detect the detection element and a detection position where the rotation sensor can detect the detection element. The shielding mechanism has a linking member that moves the shielding arm in tandem with the rotation of the pulley in first or second rotational directions. The shielding mechanism has a positioning protrusion that positions the shielding arm at either the shielding position or the detection position.

18 Claims, 11 Drawing Sheets

US 6,857,975 B2

ROTATION DIRECTION DETECTION APPARATUS

BACKGROUND OF THE INVENTION

1. Field of the Invention

The present invention generally relates to a rotation direction detection apparatus. More specifically, the present invention relates to a rotation direction detection apparatus that detects the direction of rotation of a rotating body that is rotatably mounted to a fixed unit. The present invention is especially suitable for a rear derailleur.

2. Background Information

In order to permit the gear shifting operation on a bicycle to be carried out using little effort, electric-powered gear shift mechanisms that carry out gear shifting for a bicycle using an actuator have been developed in recent years. When an external gear shift mechanism is used, because gear shifting is carried out by disengaging a chain from one of a plurality of gears, gear shifting cannot be carried out if the chain is not rotating in the forward direction, i.e., if the pedals are not being pushed in the direction of forward motion. As a result, in order to make the gear shifting operation of the external gear shift mechanism electric-powered, a rotation direction detection apparatus that can detect whether or not the pedals are being pushed in the direction of forward motion is necessary.

This type of rotation direction detection apparatus typically includes a detection element consisting of a magnet, for example, that is fixed to the bicycle cranks and a pair of reed switches that alternate between the "ON" and "OFF" states by detecting the magnetic force of the detection element. The reed switches are arranged side by side in the direction of rotation. The direction of crank rotation, which determines whether or not the pedals are being pushed in the direction of forward motion, is detected by determining which of the pair of magnets arranged in the direction of rotation turns "ON" or "OFF" first.

With the conventional rotation direction detection apparatus described above, because the direction of rotation is detected using a pair of reed switches, the construction of the apparatus becomes complex, as does the processing performed in order to detect such direction. Furthermore, because the two reed switches must be disposed with a distance therebetween in the direction of rotation, it is difficult to keep the apparatus compact in size.

In view of the above, it will be apparent to those skilled in the art from this disclosure that there exists a need for an improved rotation direction detection apparatus. This invention addresses this need in the art as well as other needs, which will become apparent to those skilled in the art from this disclosure.

SUMMARY OF THE INVENTION

An object of the present invention is to realize a rotation direction detection apparatus that has a compact and simple construction and can detect the rotation direction of a rotating body using a simple process.

Basically, this object is attained by providing a rotation direction detection apparatus comprising a fixed unit, a rotating body, a detection member coupled to the fixed unit, a detection element coupled to the rotating body and a shielding member at least partially disposed between the rotating body and the detection member. The shielding member is configured and arranged to move between a shielding position where the detection member cannot detect the detection element and a detection position where the detection member can detect the detection element. The detection position is spaced from the shielding position. The shielding member is further configured and arranged to move in tandem with the rotation of the rotating body in at least one of a first rotational direction and a second rotational direction that is opposite the first rotational direction.

The rotation direction detection apparatus pertaining to a first aspect of the invention is an apparatus that detects the direction of rotation of a rotating body that is rotatably mounted to a fixed unit, and includes a non-contact detection member, a detection element and a shielding mechanism including a shielding member, a linking member and a positioning member. The non-contact detection member is fixed to the fixed unit. The detection element is mounted to the rotating body such that it can be detected by the non-contact detection member. The shielding member is mounted to the fixed unit such that it can move between a shielding position where the non-contact detection member cannot perform detection and a detection position that is disposed at a distance from the shielded position and where the non-contact detection member can perform detection. The linking member moves the shielding member in tandem with the rotation of the rotating body in either a first direction or in a second direction that is opposite the first direction. The positioning member positions the shielding member moved by the linking member at the shielding position and at the detection position.

Using this rotation direction detection apparatus, when the rotating body rotates in the first direction, the shielding member rotates in the first direction in tandem with such rotation, and is positioned at the shielding position, for example. As a result, the non-contact detection member can no longer detect the detection element. When the rotating body rotates in the second direction, on the other hand, the shielding member rotates in the second direction in tandem with such rotation and is positioned at the detection position, for example. As a result, the non-contact detection member becomes able to detect the detection element, and it is determined that the rotating body has rotated in the second direction. Because the rotation of the rotating body in the second direction can be detected using one non-contact detection member by enabling or disabling detection by the non-contact detection member using the shielding member, a detection apparatus having a compact and simple construction can be realized. Furthermore, because signals from only one non-contact detection member need be processed, detection of the direction of rotation of the rotating body can be detected using simple processing.

The rotation direction detection apparatus according to a second aspect of the invention comprises the apparatus according to the first aspect of the invention, wherein the fixed unit is a component part of a bicycle and the rotating member rotates in tandem with the cranks of the bicycle. In this case, because rotation in the direction of forward motion of the bicycle cranks can be easily detected, control of the external gear shift mechanism becomes easy.

The rotation direction detection apparatus according to a third aspect of the invention comprises the apparatus according to the first or second aspect of the invention, wherein the non-contact detection member is a reed switch that is turned "ON" or "OFF" via magnetic force, and the detection element is a magnet. In this case, the direction of rotation can be easily detected using this reed switch.

The rotation direction detection apparatus according to a fourth aspect of the invention comprises the apparatus according to the third aspect of the invention, wherein the shielding member performs shielding from the magnetic force emitted by the detection element. In this case, detection of the detection element by the reed switch can be disabled by using the shielding member to perform shielding from the magnetic force emitted from the detection element.

The rotation direction detection apparatus according to a fifth aspect of the invention comprises the apparatus according to any of the first through fourth aspects of the invention, wherein the shielding member is mounted to the fixed unit such that it can rotate around the axis of the rotating body, and the linking member links the rotating body and the shielding member via friction. In this case, because the shielding member is linked to the rotating body solely through friction force, once the shielding member is stopped at a given position during rotation of the rotating member, the shielding member can remain at that position even if the rotating body continues to rotate.

The rotation direction detection apparatus according to a sixth aspect of the invention comprises the apparatus according to any of the first through fifth aspects of the invention, wherein the positioning member comprises a stopper member that is disposed on the fixed unit, positions the shielding member at a rotational position at which the shielding member comes to be disposed between the non-contact detection member and the detection element when the rotating body rotates in the first direction, such rotational position being deemed the shielding position, and positions the shielding member at the detection position when the rotating body rotates in the second direction. In this case, the shielding member can be positioned at the shielding position and at the detection position simply by fixing the non-contact detection member to the fixed unit at a position at which the shielding member touches the stopper member when it rotates in the first direction. As a result, the shielding member can be positioned using a simple construction, and the construction of the shielding member becomes simple.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
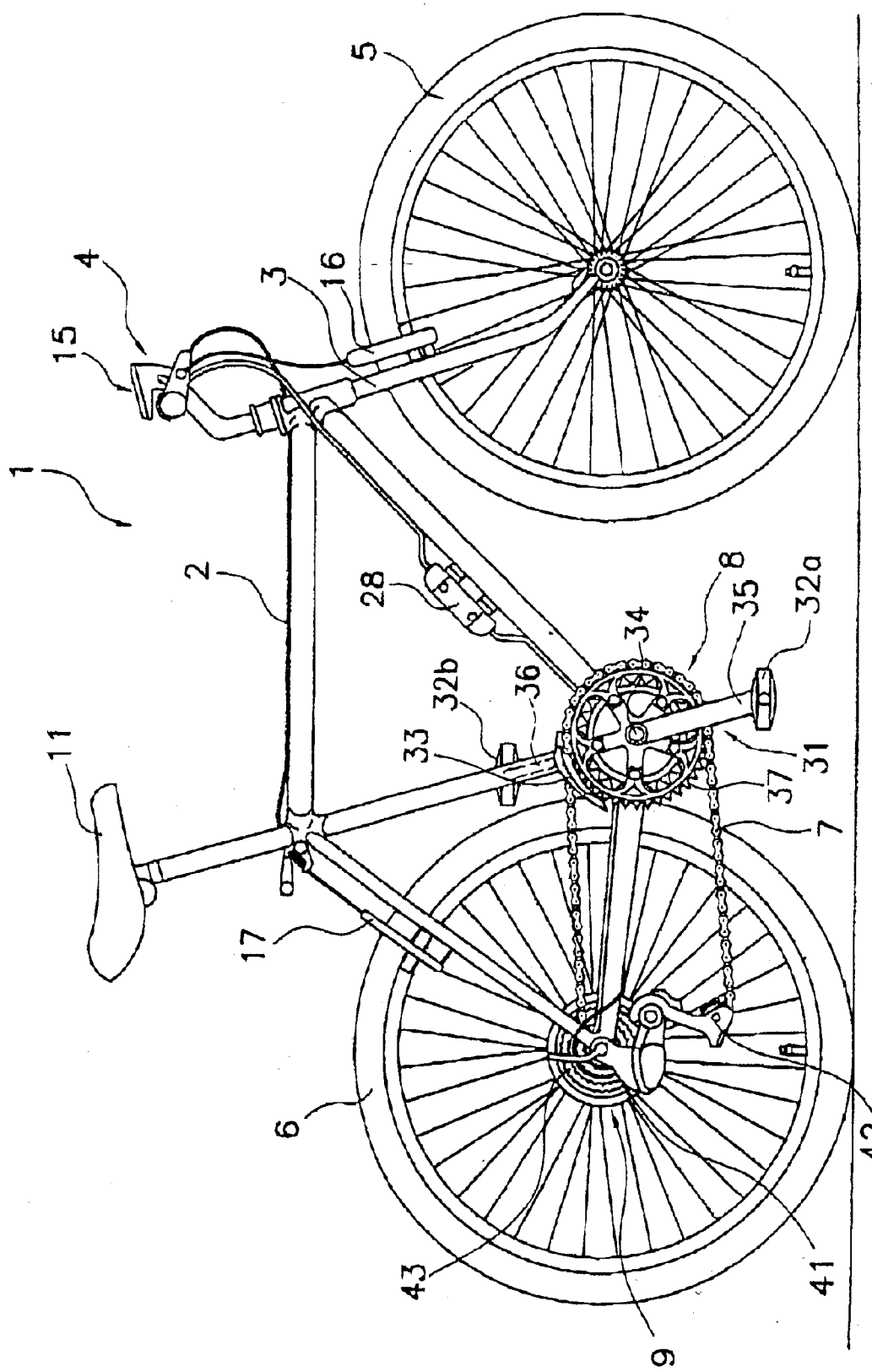
FIG. 1 is a side elevational view of a bicycle having a bicycle gear shift apparatus with a rotation direction detection apparatus in accordance with one embodiment of the present invention.

Referring initially to FIG. 1, a bicycle 1 is illustrated that is equipped with a bicycle gear shift apparatus in accordance with a first embodiment of the present invention. The bicycle 1 is applied is a mountain bike-type sports bike, and includes as its main components a frame 2, a front fork 3, a handlebar 4, a front wheel 5, a rear wheel 6, a chain 7, a front external gear shift mechanism 8 and a rear external gear shift mechanism 9.

The frame 2 is the base of the bicycle 1, and basically includes the front fork 3 at the front part thereof, the front external gear shift mechanism 8 at the lower middle part thereof, and the rear wheel 6 and the rear external gear shift mechanism 9 at the rear part thereof. Furthermore, a saddle 11 on which the rider sits is disposed at the upper middle part of the frame 2.

The front fork 3 is a member that is mounted to the front part of the frame 2 such that it can revolve around its shaft, which is aligned in a slanted fashion. The handlebar 4 is mounted to the top part of the front fork 3, while the front wheel 5 is disposed at the bottom of the front fork 3.

Figure 2:
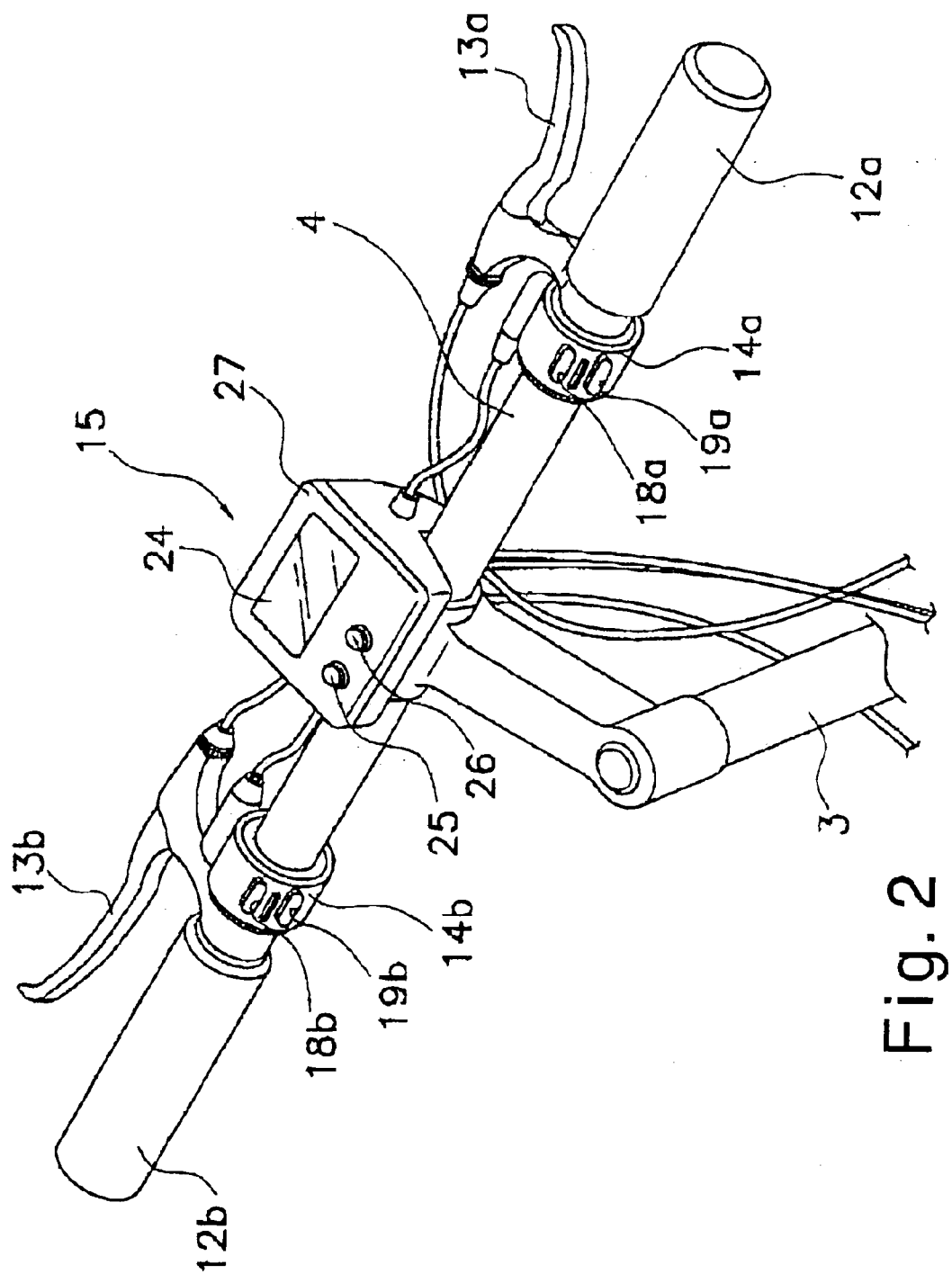
FIG. 2 is a perspective view of the handlebar, a portion of the bicycle gear shift apparatus and other nearby components used with the bicycle illustrated in FIG. 1.

As shown in FIG. 2, the handlebar 4 has a pair of grips 12a and 12b and a pair of brake levers 13a and 13b, with one of each being located at each end of the handlebar 4. In addition, the handlebar 4 has a pair of gear shift operation units 14a and 14b. The gear shift operation units 14a and 14b are disposed on the handlebar 4 inside the grips 12a and 12b and the brake levers 13a and 13b. Furthermore, a gear shift control apparatus 15 is mounted to the center of the handlebar 4 This gear shift control apparatus 15 is operatively (electrically) connected to the gear shift operation units 14a and 14b.

The brake levers 13a and 13b are used for braking of the front wheel 5 and the rear wheel 6, respectively, and are operatively connected to the front wheel brake 16 and the rear wheel brake 17, respectively, as described below.

The gear shift operation units 14a and 14b are used to conduct gear shift operations with regard to the rear external gear shift mechanism 9 and the front external gear shift mechanism 8. A rear upshift button 18a and a rear downshift button 19a are disposed on the gear shift operation unit 14a, and a front upshift button 18b and a front downshift button 19b are disposed on the gear shift operation unit 14b. The upshift buttons 18a and 18b output gear shift signals to the gear shift control apparatus 15 for instructing the external gear shifting mechanisms 9 and 8 to shift from the active gear (described below) to the next higher gear ("shift-up"). Similarly, the downshift buttons 19a and 19b output gear shift signals to the gear shift control apparatus 15 for instructing the external gear shifting mechanisms 9 and 8 to shift from the active gear to the next lower gear ("shift-down").

Figure 3:
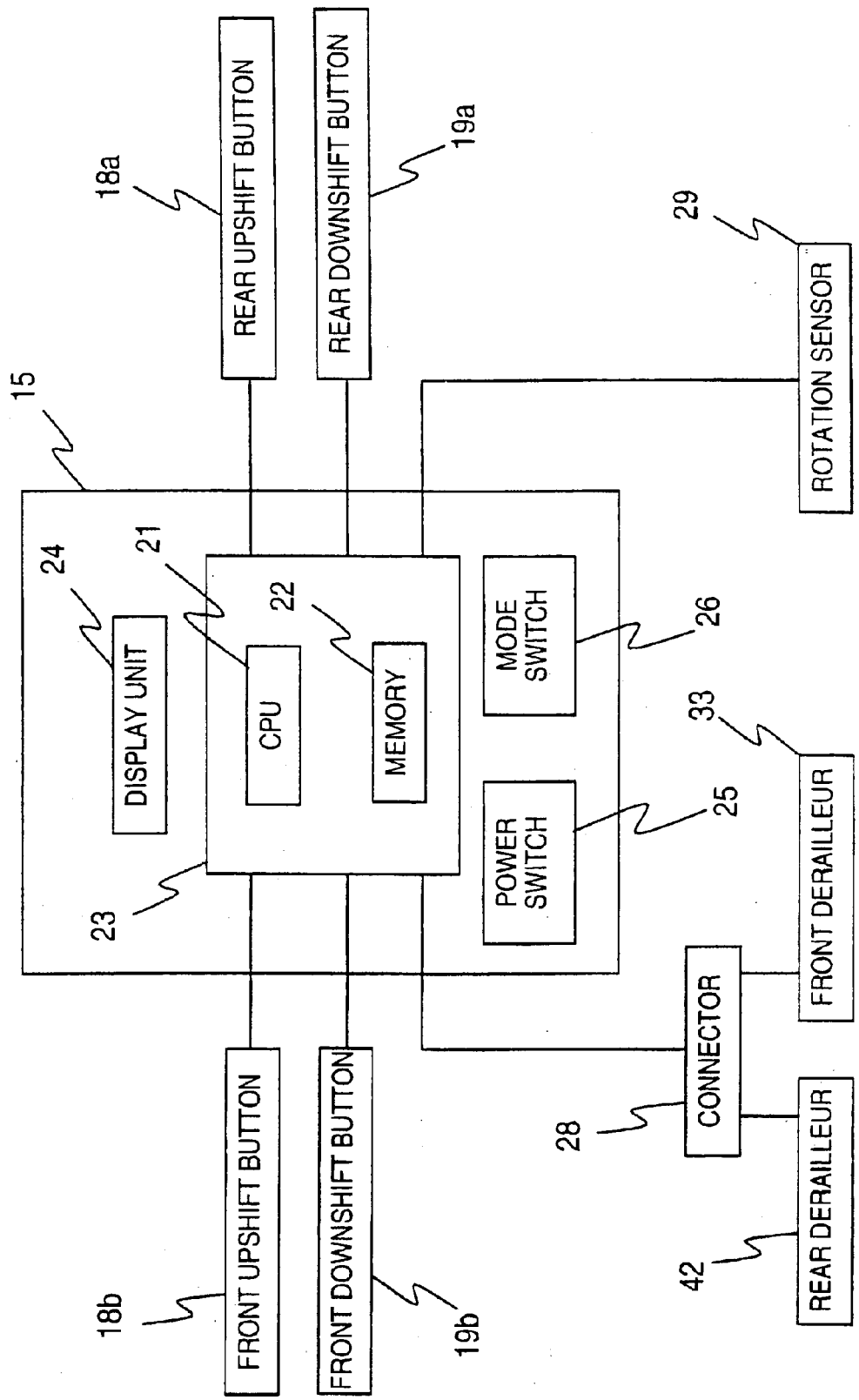
FIG. 3 is a control block diagram illustrating to the bicycle gear shift apparatus in accordance with the present invention.

The gear shift control apparatus 15 performs a gear shift control with regard to the front external gear shift mechanism 8 and the rear gear shift mechanism 9 in response to the outputs of the gear shift signals from the gear shift operation units 14b and 14a, respectively. As shown in FIG. 3, the gear shift control apparatus 15 basically includes a controller 23 comprising a CPU 21 and a memory 22, a display unit 24 that displays the current active gear, a power switch 25 and a mode switch 26. The controller 23 controls the gear shift control apparatus 15 via the CPU 21 in accordance with the data and/or program(s) stored in the memory 22. The display unit 24, the power switch 25 and the mode switch 26, as well as the gear shift buttons 18a, 18b, 19a and 19b, a connector 28 and a rotation sensor 29, are all operatively (electrically) connected to the controller 23. The connector 28 generates and/or outputs signals that drive the derailleurs 33 and 42 (described below) of the front external gear shift mechanism 8 and the rear external gear shift mechanism 9 based on the gear shift signals. The rotation sensor 29 detects whether or not the cranks 35 and 36 (described below) are rotating in the direction of forward motion of the bicycle 10. The rotation sensor 29 is mounted to the rear derailleur 42 in the preferred embodiment.

The mode switch 26 changes the mode of the gear shift control apparatus 15. In this embodiment, either an automatic gear shift mode or a manual gear shift mode can be selected via an operation of the mode switch 26. The automatic gear shift mode preferably determines the optimal gear based on the speed of the bicycle and/or other parameters. In the automatic gear shift mode, the front external gear shift mechanism 8 and the rear external gear shift mechanism 9 are controlled in accordance with the shift-up and shift-down threshold values that are predetermined for each gear. In the manual gear shift mode, the front external gear shift mechanism 8 and the rear external gear shift mechanism 9 are controlled based on the operations of the gear shift operation units 14a and 14b.

As seen in FIG. 2, the gear shift control apparatus 15 includes a box-shaped control case 27 with the display unit 24, the power switch 25, and the mode switch 26 disposed on the top surface thereof. Furthermore, the gear shift control apparatus 15 is operatively connected to the front external gear shift mechanism 8 and the rear external gear shift mechanism 9 via the connector 28.

The front hub of the front wheel 5 is mounted to the bottom of the front fork 3, and a front wheel brake 16 that carries out braking of the front wheel 5 is disposed at the upper part of the front fork 3. The rear hub of the rear wheel 6 is mounted to the rear part of the frame 2, with the rear external gear shift apparatus 9 mounted to the rear hub. A rear wheel brake 17 that performs braking of the rear wheel 6 is disposed at the top part of the rear wheel 6.

The chain 7 is wound around the front external gear shift mechanism 8 and the rear external gear shift mechanism 9. The chain 7 transmits drive power from the front external gear shift mechanism 8 to the rear external gear shift mechanism 9.

The front external gear shift mechanism 8 is mounted to the lower middle part of the frame 2, and comprises a mechanism that transmits the drive power from the rider to the rear external gear shift mechanism 9 via the chain 7. The front external gear shift mechanism 8 has two sprockets 37 consisting of a larger sprocket and a smaller sprocket, and a front derailleur 33.

The two sprockets 37 are mounted to the crank unit 31 in a conventional manner. The crank unit 31 rotates due to the pushing of the pedals 32a and 32b by the rider. The crank unit 31 comprises a crankshaft 34, a right crank 35 and a left crank 36. The crankshaft 34 is disposed laterally at the bottom area of the center of the frame 2, and is rotatably mounted to the frame 2. One end of the right crank 35 is connected to the right side of the crankshaft 34, and the two sprockets 37 are fixed to this right crank 35. One end of the left crank 36 is connected to the left side of the crankshaft 34. The pedals 32a and 32b are rotatably mounted to the other ends of the right crank 35 and the left crank 36 around the peripheries thereof.

The front derailleur 33 moves the chain 7 such that it resides over one of the two sprockets 37. The front derailleur 33 is movable using a solenoid (not shown) that is operatively controlled by the gear shift control apparatus 15, either manually or automatically. The front derailleur 33 moves under the control of the gear shift control apparatus 15, and can detect the current active gear via a gear position sensor (not shown).

The rear external gear shift mechanism 9 is mounted to the peripheral area of the rear hub of the rear wheel 6, and constitutes a mechanism that transmits the drive power that is transmitted thereto via the chain 7 to the rear wheel 6. The rear external gear shift mechanism 9 comprises a rear sprocket wheel 41 and a rear derailleur 42. The rear derailleur 42 operates under the control of the gear shift control apparatus 15, and can detect the current active gear via a gear position sensor (not shown).

The rear sprocket wheel 14 comprises seven sprockets 43a–43g of different sizes that are aligned in the axial direction and are mounted coaxially to the hub of the rear wheel 6.

The rear derailleur 42 moves the chain 7 such that it resides on one of the seven sprockets 43a–43g. The rear derailleur 42 is moved via a motor (not shown) for shifting the chain 7 between sprockets 43a–43g.

The rear derailleur 42 basically includes a base member 50, a movable member 51, a chain guide 52, a linking mechanism 53, an upper guide pulley 54 and a lower tension pulley 55. The rear derailleur 42 further includes a rotation direction detection mechanism 60 mounted between the chain guide 52 and the lower tension pulley 55. Of course, it will be apparent to those skilled in the art from this disclosure that the rotation direction detection mechanism 60 can also be mounted between the chain guide 52 and the upper guide pulley 54 as in the second embodiment described below.

The base member 50 is mounted to the rear end of the frame 2. The movable member 51 is disposed at a distance from the base member 50. The chain guide 52 is movably mounted to the movable member 51. The linking mechanism 53 operatively connects the base member 50 and the movable member 51 together. A drive motor and a positioning mechanism (not shown) are housed in the base member 50 to position the movable member 51 and the chain guide 52 relative to the sprockets 43*a*–43*g*.

Figure 4:
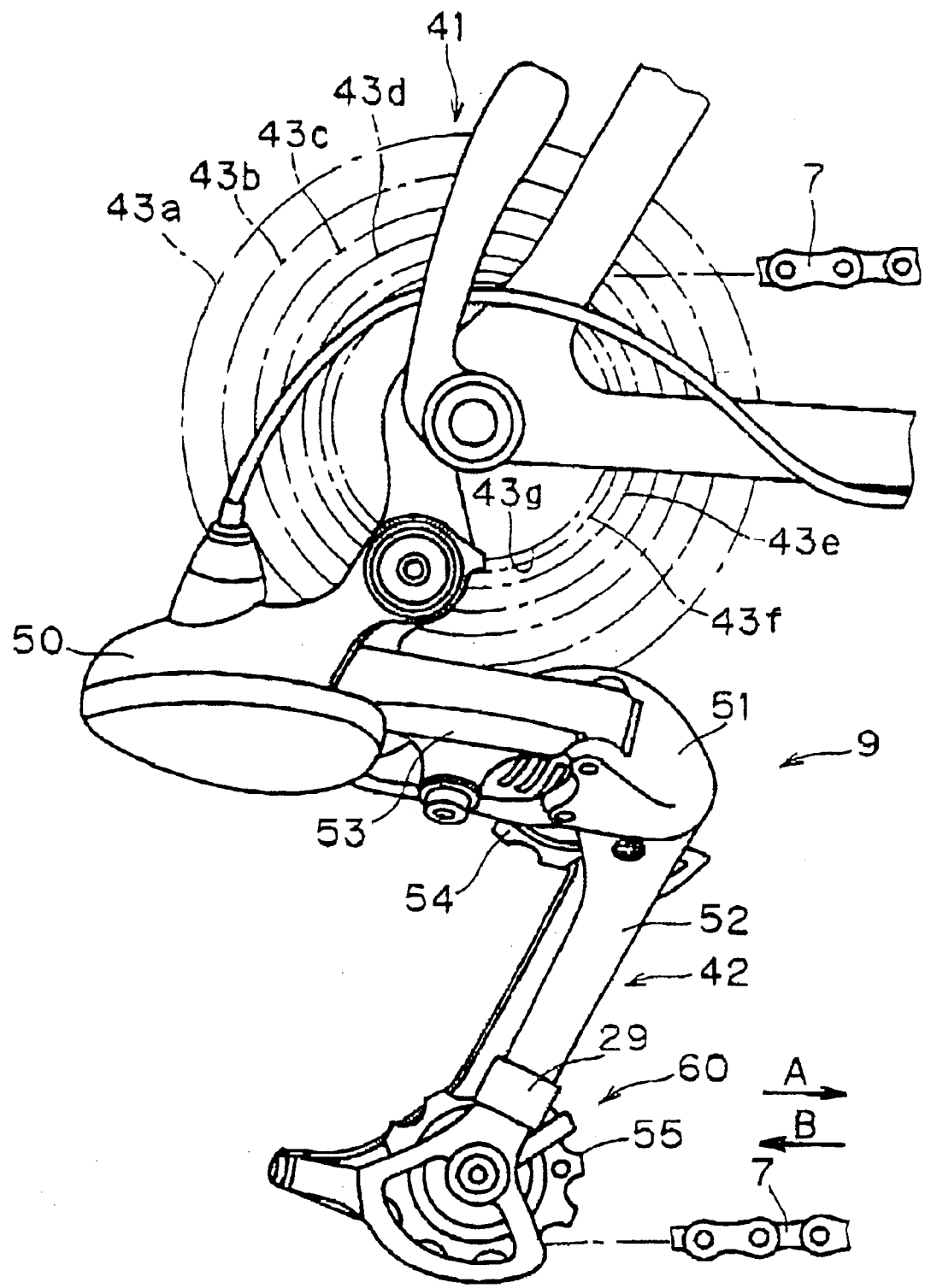
FIG. 4 is a partial side elevational view of the bicycle illustrated in FIG. 1 that shows the rear external gear shift apparatus with the rotation direction detection apparatus mounted to the rear external gear shift apparatus rear derailleur in accordance with the embodiment of the present invention.
Figure 6:
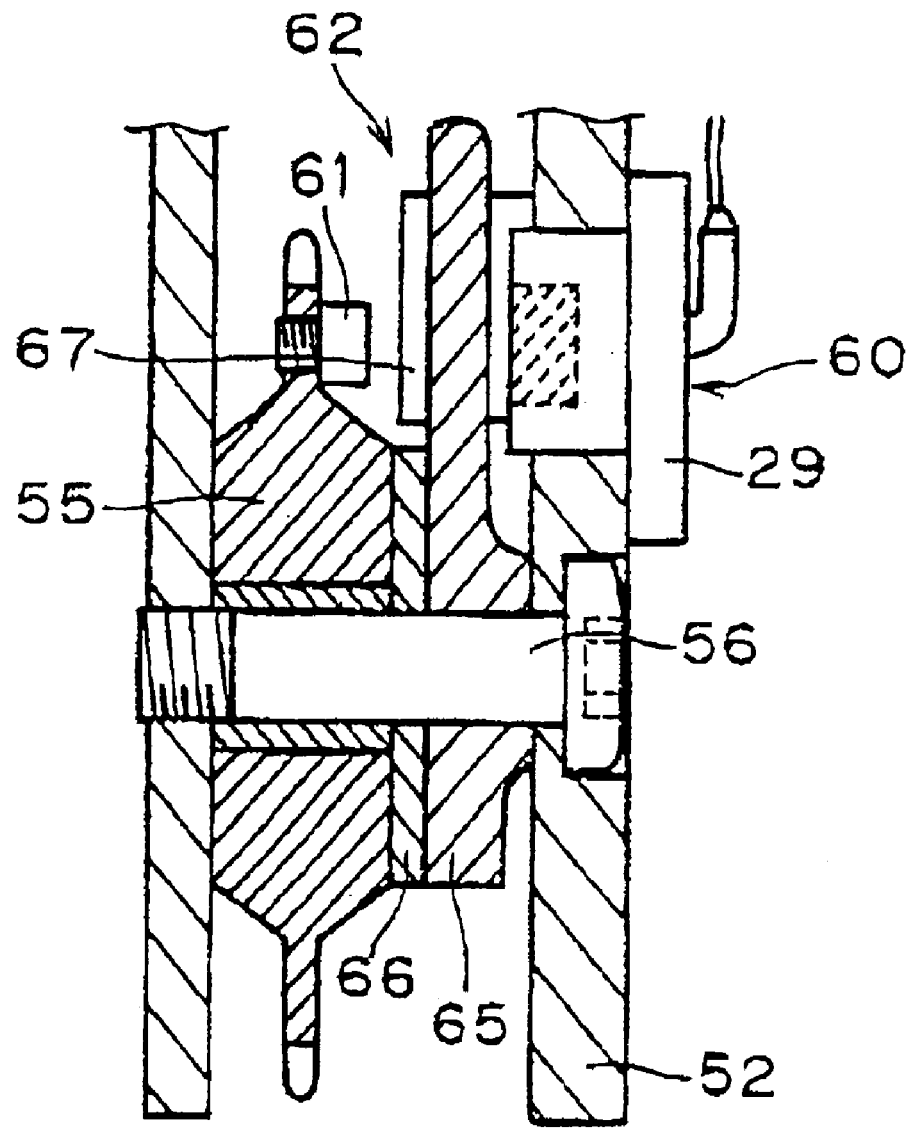
FIG. 6 is a cross-sectional view of the lower part of the rear derailleur and the rotation direction detection apparatus illustrated in FIGS. 4 and 5.

The upper guide pulley 54 and the lower tension pulley 55 are rotatably mounted to the chain guide 52 which in turn is rotatably mounted to the movable member 51. The movable member 51 applies force to the chain guide 52 in the clockwise direction as viewed in FIG. 4 in order to apply tension to the chain 7. The linking mechanism 53 moves the chain guide 52 laterally in the axial direction of the hub, and has four links that are aligned laterally. Force is applied to the linking mechanism 53 toward the direction of the smallest-diameter sprocket 43*g*. The chain guide 52 comprises two plate-shaped members with the lower tension pulley 55 being rotatably mounted to its lower end and the upper guide pulley 54 being rotatably mounted to its upper end. The lower tension pulley 55 is rotatably mounted to a fixed shaft 56 (see FIG. 6) that is mounted to the lower end of the chain guide 52.

The rotation direction detection mechanism 60 detects the rotation of the cranks 35 and 36 in the direction of forward motion by detecting rotation of the lower tension pully 55 of the rear derailleur 42. The rotation direction detection mechanism 60 has a rotation sensor 29 that is fixed to the chain guide 52, a detection element 61 that is mounted to the lower tension pulley 55 such that it can be detected by the rotation sensor 29, and a shielding mechanism 62 that permits the rotation sensor 29 to perform output only when the cranks 35 and 36 are rotating in the direction of forward motion. The rotation sensor 29 is preferably a reed switch that alternates between the "ON" and "OFF" states based on magnetic force from the detection element 61. The detection element 61 includes a magnet that is fixed to the periphery of the lower tension pulley 55. When the detection element 61 passes the position opposite the rotation sensor 29, the rotation sensor 29 outputs a pulse.

The shielding mechanism 62 preferably includes a shielding arm 65, a linking member 66 and a positioning protrusion 67. Of course, it will be apparent to those skilled in the art from this disclosure that the linking member 66 is not essential elements of the shielding mechanism 62. Rather, it will be apparent to those skilled in the art from this disclosure that the shielding arm 65 can be arranged to operate on friction alone.

The linking member 66 is arranged and configured to cause the shielding arm 65 to rotate in tandem with the rotation of the pulley 55 in a first direction A (the direction opposite to the crank rotational direction of forward motion) and a second direction B (the direction of the crank rotational direction of forward motion). The positioning protrusion 67 is arranged and configured to position the shielding arm 65 that was moved by the linking member 66 at either a shielding position or a detection position.

Figure 5:
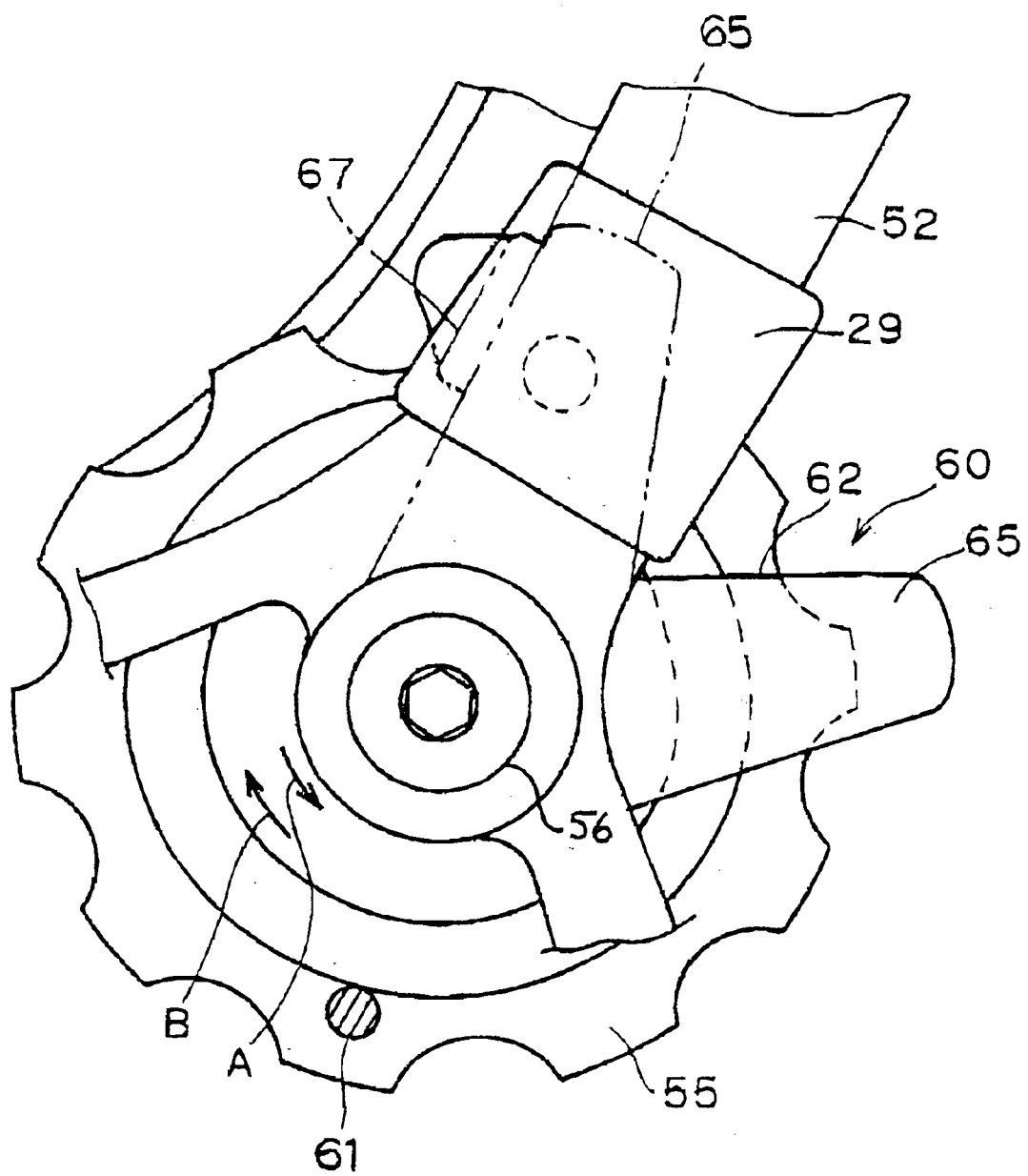
FIG. 5 is an enlarged, partial side elevational view of the lower part of the rear derailleur and the rotation direction detection apparatus illustrated in FIG. 4.

The shielding arm 65 is rotatably mounted to the chain guide 52 such that it can rotate between the shielding position where the rotation sensor 29 cannot detect the detection element 61 (the position facing the rotation sensor 29 indicated by the two-dot chain line in FIG. 5) and the detection position that is located at a distance from the shielding position where the rotation sensor 29 can detect the detection element 51. The shielding arm 65 is preferably an aluminum plate-shaped member, for example, that provides shielding from magnetic force of the detection element 61. The shielding arm 65 is rotatably mounted to the fixed shaft 56 while being aligned with the lower tension pulley 55. As a result, the shielding arm 65 can be disposed between the detection element 61 and the rotation sensor 29.

The linking member 66 is mounted between the lower tension pulley 55 and the shielding arm 65 such that it is in contact with both, and connects them via friction force. As a result, when the shielding arm 65 is stopped at a position by the positioning protrusion 67, the linking member 66 slides against the shielding arm 65. Therefore, because the shielding arm 65 is linked to the lower tension pulley 55 only via friction force, when the shielding arm 65 is stopped at a particular position during rotation of the lower tension pulley 55, the shielding arm 65 can remain at that position even if the lower tension pulley 55 continues to rotate.

The positioning protrusion 67 is preferably integrally formed with the chain guide 52. When the lower tension pulley 55 rotates in the first direction A, the positioning protrusion 67 positions the shielding arm 65 at a rotational position at which the shielding arm 65 is disposed between the rotation sensor 29 and the detection element 61. This position is deemed the shielding position. When the pulley 55 rotates in the second rotational direction B, the positioning protrusion 67 positions the shielding arm 65 at the detection position. In this way, simply by fixing the rotation sensor 29 to the chain guide 52 at a position corresponding to the position at which the shielding arm 65 comes into contact with the positioning protrusion 67 during rotation in the first rotational direction, the shielding arm 65 can be positioned at either the shielding position or the detection position. As a result, the shielding arm 65 can be positioned using a simple construction, and the construction of the shielding mechanism 62 becomes simple.

Figure 7:
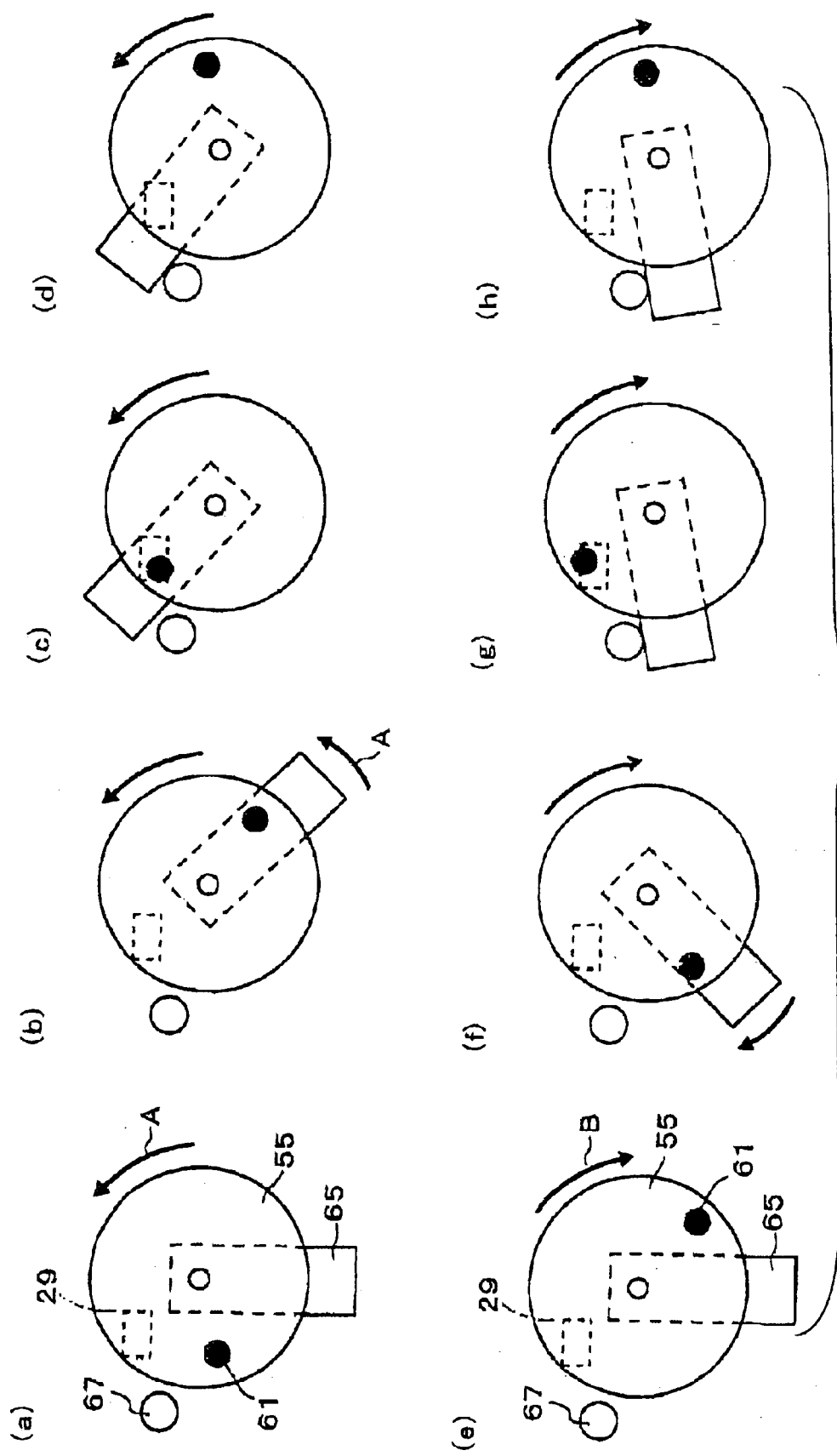
FIG. 7 is a series of schematic drawings that illustrate the operation of the rotation direction detection apparatus in accordance with the embodiment of the present invention illustrated in FIGS. 1–6.

In the rotation direction detection apparatus 60 having the above construction, when the pedals 32*a* and 32*b* are pressed in the direction opposite to the direction of forward motion, for example, and the lower tension pulley 55 rotates in the first rotational direction A as shown in steps (a) and (b) of FIG. 7, the shielding arm 65 also rotates in this direction due to the action of the linking member 66, and the shielding arm 65 becomes positioned at the shielding position shown in step (c) of FIG. 7 by the positioning protrusion 67. The shielding position is the position facing the rotation sensor 29. When the shielding arm 65 is at the shielding position, because the linking member 66 connects the lower tension pulley 55 and the shielding arm 65 only via friction force, the lower tension pulley 55 continues to rotate even if the shielding arm 65 is stopped at that position. Even when the detection element 61 mounted to the lower tension pulley 55 rotates to the position facing the rotation sensor 29, because the shielding arm 65 is disposed between the detection element 61 and the rotation sensor 29 and the rotation sensor 29 cannot detect the magnetic force of the detection element 61, the rotation sensor 29 does not output an electrical pulse to the gear shift control apparatus 15.

On the other hand, when the pedals 32*a* and 32*b* are pushed in the direction of forward motion of the bicycle, causing the lower tension pulley 55 to rotate in the second rotational direction B as shown in steps (e) and (f) of FIG. 7, the shielding arm 65 also rotates in the same direction due to the action of the linking member 66, and the shielding arm 65 becomes positioned at the detection position shown in step (g) of FIG. 7 by the positioning protrusion 67. The detection position is a position that does not face the rotation sensor 29. Here as well, because the linking member 66 connects the lower tension pulley 55 and the shielding arm 65 only via friction force, the lower tension pulley 55 continues to rotate even if the shielding arm 65 is stopped at the detection position. When the detection element 61 mounted to the lower tension pulley 55 rotates to the position facing the rotation sensor 29, because the shielding arm 65 is not disposed between the detection element 61 and the rotation sensor 29, the rotation sensor 29 detects the magnetic force from the detection element 61 and outputs an electrical pulse to the gear shift control apparatus 15. As a result, it can be determined from the pulses output from the rotation sensor 29 of the rotation direction detection apparatus 60 whether or not the cranks 35 and 36 are rotating in the direction of forward motion of the bicycle.

Because the rotation direction detection apparatus 60 having the above construction can detect whether or not the cranks 35 and 36 are rotating in the direction of forward motion of the bicycle using a single rotation sensor 29, a compact and simple construction can be realized. Furthermore, because signals from only a single rotation sensor 29 need be processed, the direction of rotation of the cranks 35 and 36 can be detected using simple processing.

Operation

As an example of the gear shift control method implemented by the gear shift control apparatus 15, the gear shift control method executed by the rear external gear shift apparatus 9 will be described below with reference to the control flow chart shown in FIG. 8. Because with the exception that there are fewer gears, the gear shift control method executed by the front external gear shift apparatus 8 is identical to the method used by the rear external gear shift apparatus 9, such method will be omitted from this description.

The gear shift control of the bicycle 1 is enabled by the rider turning "ON" the power switch 25 to the gear shift control apparatus 15. When the power switch 25 is turned "ON", first, the gear shift control apparatus 15 is initialized in step S1. At the same time, the contents of the memory 22 are initialized. For example, the active gear SH is set to second gear.

In step S2, the current gear position is obtained from the gear position sensor of the rear derailleur 42, and this gear position is stored in the memory 22 as the value SH. The value SH is a value used in order to store the value of the currently active gear, such that when the current gear is the first gear, the value corresponding to that gear, i.e. "1", is stored, and when the current gear is the third gear, the value "3" is stored, for example. After the value SH is stored, the CPU 21 of the gear shift control apparatus 15 moves to step S3.

In step S3, it is determined whether or not a shift-up command has been issued. In manual gear shift mode, this determination is made by determining whether or not the rear upshift button 18a of the gear shift operation unit 14a has been pressed and a shift-up gear shift signal has been output. In automatic gear shift mode, the determination is made by determining whether or not the vehicle speed has exceeded a shift-up threshold value corresponding to each gear. In step S4, it is determined whether or not a shift-down command has been issued. In manual gear shift mode, this determination is made by determining whether or not the rear downshift button 19a of the gear shift operation unit 14a has been pressed and a shift-down gear shift signal has been output. In automatic gear shift mode, the determination is made by determining whether or not the vehicle speed has become lower than a shift-down threshold value corresponding to each gear. In step S5, it is determined whether or not a command for other processing, such as for display or for various setting processes, has been issued.

Where a shift-up command has been issued in step S3, the CPU 21 advances from step S3 to step S6, and it is determined from the pulse emitted from the rotation sensor 29 whether or not the cranks 35 and 36 are rotating in the direction of forward motion of the bicycle. If the cranks 35 and 36 are rotating in the direction of forward motion (i.e., in the second direction B), the sensor 29 emits a pulse as described above, while if not, i.e., if the cranks 35 and 36 are rotating in the first direction A or are stopped, no pulse is emitted, as described above.

Because the external gear shift mechanisms 8 and 9 displace the chain 7 from one sprocket to another sprocket in order to shift gears, gear shifting cannot take place unless the chain 7 is rotating and tension is being applied thereto. Therefore, if the rider is not pushing the pedals 32a and 32b in the direction of forward motion in step S6, the gear shift operation is not performed. If the determination in step S6 is "NO", the gear shift operation is not performed and the CPU 21 returns to step S4. If it is determined in step S6 that the cranks 35 and 36 are rotating in the direction of forward motion, the CPU 21 advances to step S7. In step S7, a shift-up signal is outputted to the connector 28 from the CPU 21. The connector 28 outputs a drive signal to the rear derailleur 42 based on the shift-up signal. Consequently, the rear derailleur 42 shifts up to the next higher speed.

If a shift-down command is issued in step S4, the CPU 21 advances from step S4 to step S8, and it is determined based on the pulses from the rotation sensor 29, in the same fashion as in step S6, whether or not the cranks 35 and 36 are rotating in the direction of forward motion. If the determination in step S8 is "NO", the gear shift operation is not performed and the CPU 21 returns to step S5. If it is determined in step S8 that the cranks 35 and 36 are rotating in the direction of forward motion, the CPU 21 advances to step S9. In step S9, a shift-down signal is outputted to the connector 28 from the CPU 21. The connector 28 outputs a drive signal to the rear derailleur 42 based on the shift-down signal. Consequently, the rear derailleur 42 shifts down to the next lower speed.

Where other processing commands are issued, the CPU 21 advances to the steps S5 through S10 and carries out such other processes.

In this embodiment, because detection of the rotation of the cranks 35 and 36 in the direction of forward motion by a single rotation sensor 29 is enabled by using the shielding arm 65 to render the rotation sensor 29 unable to perform detection, the detection apparatus 60 can be realized using a compact and simple construction. Furthermore, because such detection can be performed by processing the signals from a single rotation sensor 29, the direction of rotation of the cranks 35 and 36 can be detected through simple processing.

In addition, because an inexpensive and small magnetically-activated reed switch is used as the non-contact sensor in the present invention, the cost of the apparatus can be further reduced.

Second Embodiment

Figure 10:
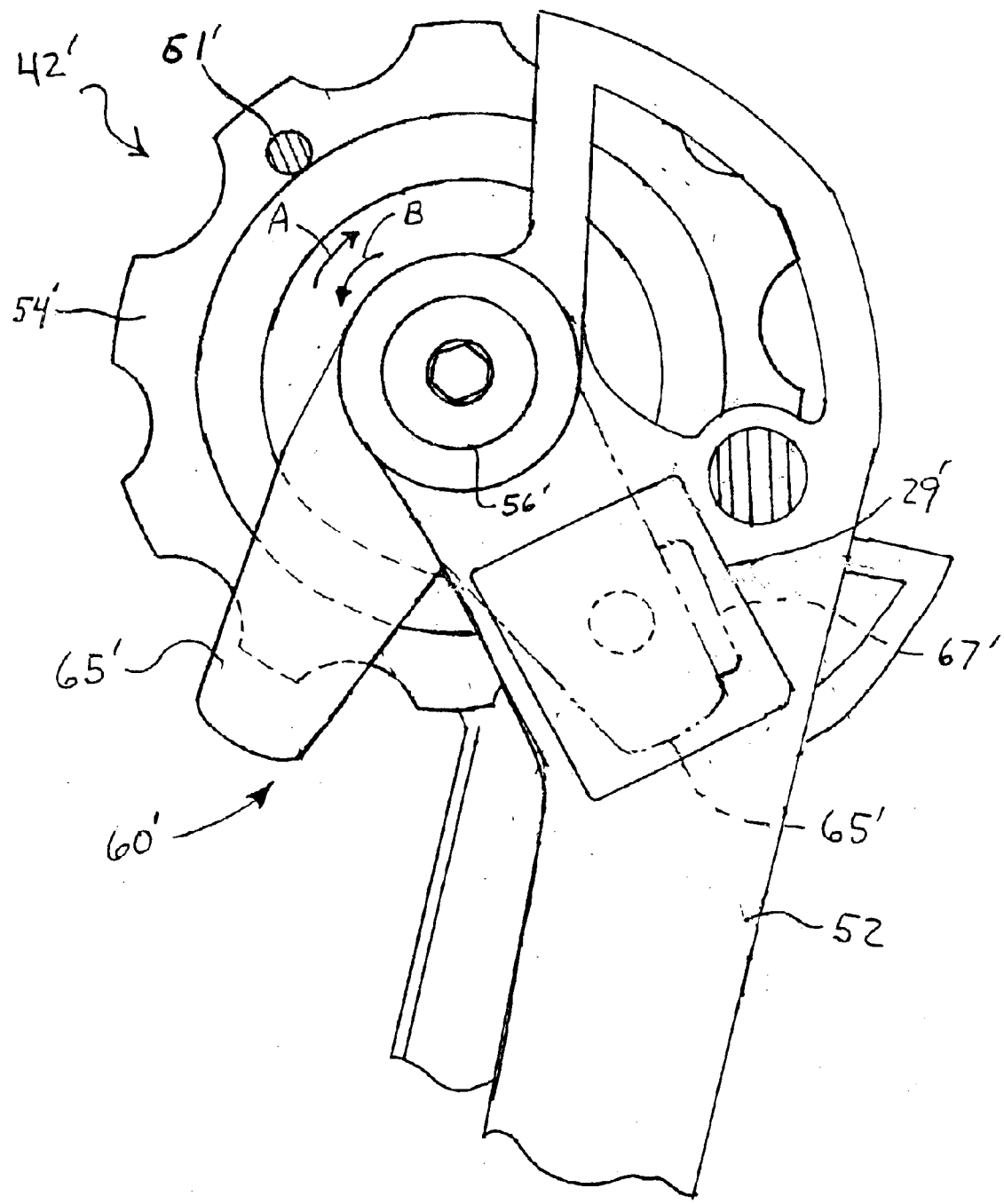
FIG. 10 is an enlarged, partial side elevational view of the upper part of the rear derailleur and a rotation direction detection apparatus in accordance another embodiment of the present invention.
Figure 11:
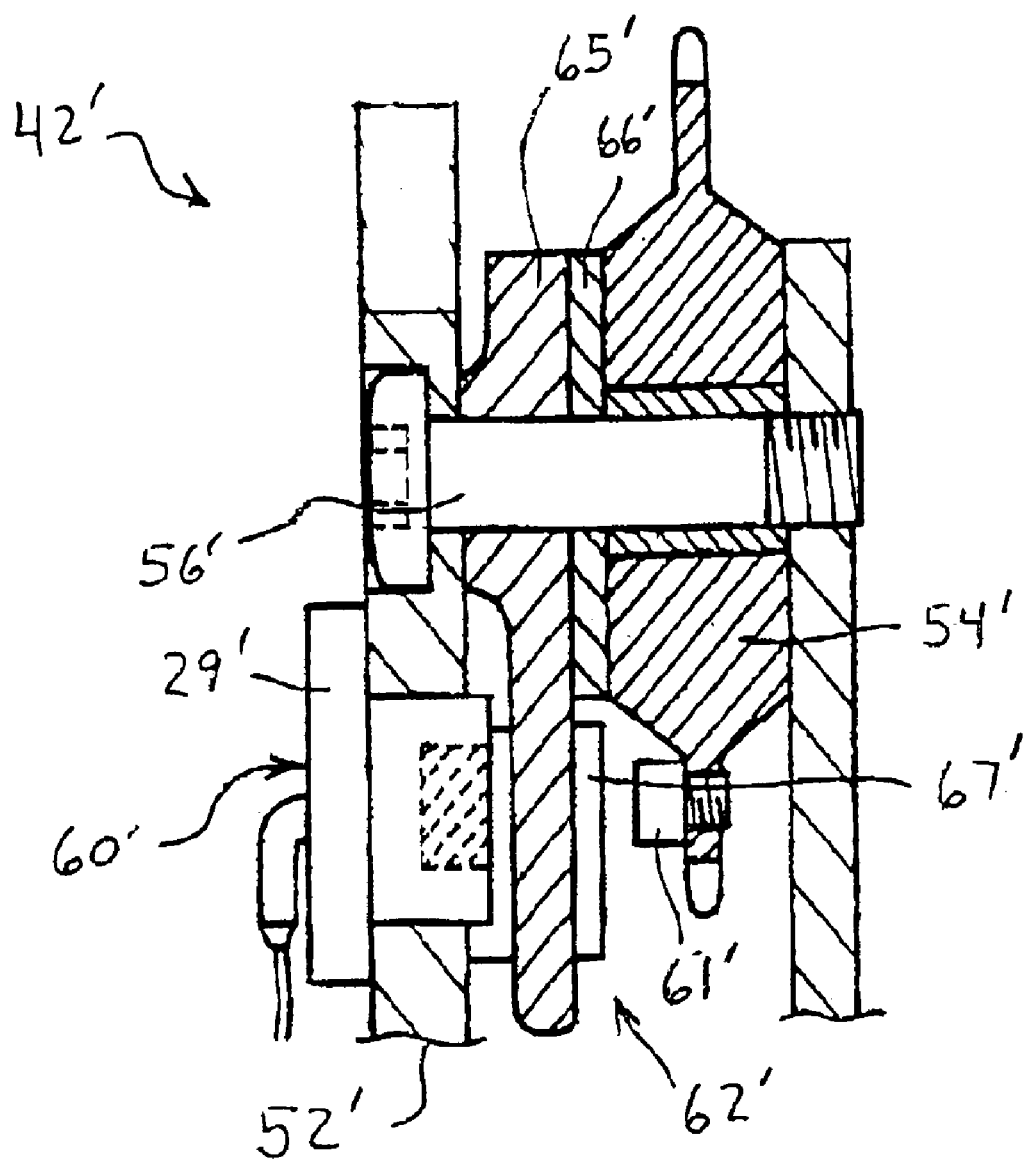
FIG. 11 is a cross-sectional view of the upper part of the rear derailleur and the rotation direction detection apparatus illustrated in FIG. 10.

Referring now to FIGS. 10 and 11, a rotation direction detection apparatus 60' that has been mounted to the upper part of a rear derailleur 42' in accordance with another embodiment will now be explained. The rear derailleur 42' is identical to the rear derailleur 42 of the first embodiment, except that the position of the rotation direction detection apparatus 60' is different from the position of the rotation direction detection apparatus 60 on the rear derailleur 42. Moreover, the rotation direction detection apparatus 60' is identical to the rotation direction detection apparatus 60 of the first embodiment, except that the rotation direction detection apparatus 60' is mounted to the upper part of the rear derailleur 42' instead of the lower part of the rear derailleur 42. Thus, the rear derailleur 42' with the rotation direction detection apparatus 60' can be substituted for the rear derailleur 42 with the rotation direction detection apparatus 60. Accordingly, the rear derailleur 42' and the rotation direction detection apparatus 60' will not be discussed and/or illustrated in detail. Rather, only the differences between the first and second embodiments will be discussed and/or illustrated herein.

The rotation direction detection mechanism 60' detects the rotation of the upper guide pulley 54', and thus indicates when the cranks 35 and 36 of the bicycle 1 are rotating in the direction of forward motion or rearward motion of the bicycle 1. The rotation direction detection mechanism 60' basically includes a rotation sensor 29', a detection element 61' and a shielding mechanism 62'. The rotation sensor 29' is fixed to the chain guide 52', while the detection element 61' is fixedly mounted to the upper guide pulley 54' such that it can be detected by the rotation sensor 29'. The shielding mechanism 62' permits the rotation sensor 29' to only output an electrical pulse to the gear shift apparatus 15 when the cranks 35 and 36 of the bicycle 1 are rotating in the direction of forward motion. The rotation sensor 29' is preferably a reed switch that alternates between the "ON" and "OFF" states based on magnetic force from the detection element 61'. The detection element 61' includes a magnet that is fixed to the periphery of the upper guide pulley 54'. When the detection element 61' passes the position opposite the rotation sensor 29', the rotation sensor 29' outputs an electrical pulse to the gear shift apparatus 15.

The shielding mechanism 62' preferably includes a shielding arm 65', a linking member 66' and a positioning protrusion 67'. Of course, it will be apparent to those skilled in the art from this disclosure that the linking member 66' is not essential elements of the shielding mechanism 62'. Rather, it will be apparent to those skilled in the art from this disclosure that the shielding arm 65' can be arranged to operate on friction alone.

The shielding arm 65' and the linking member 66' are rotatably mounted on the fixed shaft 56' of the upper guide pulley 54'. The linking member 66' is arranged and configured to cause the shielding arm 65' to rotate in tandem with the rotation of the upper guide pulley 54' in a first direction A' (the direction opposite to the crank rotational direction of forward motion) and a second direction B' (the direction of the crank rotational direction of forward motion). Preferably, the linking member 66' frictionally couples the shielding arm 65' to of the upper guide pulley 54' such that they rotate in tandem. The positioning protrusion 67' is arranged and configured to position the shielding arm 65' that was moved by the linking member 66' at either a shielding position or a detection position. In the illustrated embodiment, the positioning protrusion 67' is a flange that extends through an opening in the chain guide 52 so as to be positioned in the path of rotation of the shielding arm 65'. Thus, the positioning protrusion 67' limits the rotational movement of the shielding arm 65' such that the shielding arm 65' stops in either a shielding position or a detection position.

The shielding arm 65' is rotatably mounted to the chain guide 52' on the fixed shaft 56' such that it can rotate between the shielding position where the rotation sensor 29' cannot detect the detection element 61' (the position facing the rotation sensor 29' as indicated by the two-dot chain line in FIG. 10) and the detection position that is located at a distance from the shielding position where the rotation sensor 29' can detect the detection element 51'. The shielding arm 65' is preferably an aluminum plate-shaped member that provides shielding from the magnetic force of the detection element 61'. The shielding arm 65' is rotatably mounted to the fixed shaft 56, while being aligned with the upper guide pulley 54'. As a result, the shielding arm 65' can be disposed between the detection element 61' and the rotation sensor 29'.

The linking member 66' is mounted between the upper guide pulley 54' and the shielding arm 65' such that it is in contact with both, and connects them via friction force. As a result, when the shielding arm 65' is stopped at a position by the positioning protrusion 67', the linking member 66' slides against the shielding arm 65'. Therefore, because the shielding arm 65' is linked to the upper guide pulley 54 only via friction force, when the shielding arm 65' is stopped at a particular position during rotation of the upper guide pulley 54', the shielding arm 65' can remain at that position even if the upper guide pulley 54' continues to rotate.

The positioning protrusion 67' is preferably integrally formed with the chain guide 52'. When the upper guide pulley 54' rotates in the first direction A, the positioning protrusion 67' positions the shielding arm 65' at a rotational position at which the shielding arm 65' is disposed between the rotation sensor 29' and the detection element 61'. This position is deemed the shielding position. When the upper guide pulley 54' rotates in the second direction B', the positioning protrusion 67' positions the shielding arm 65' at the detection position. In this way, simply by fixing the rotation sensor 29' to the chain guide 52 at a position corresponding to the position at which the shielding arm 65' comes into contact with the positioning protrusion 67' during rotation thereof in the first direction A', the shielding arm 65' can be positioned at either the shielding position or the detection position. As a result, the shielding arm 65' can be positioned using a simple construction, and the construction of the shielding mechanism 62' becomes simple.

Figure 8:
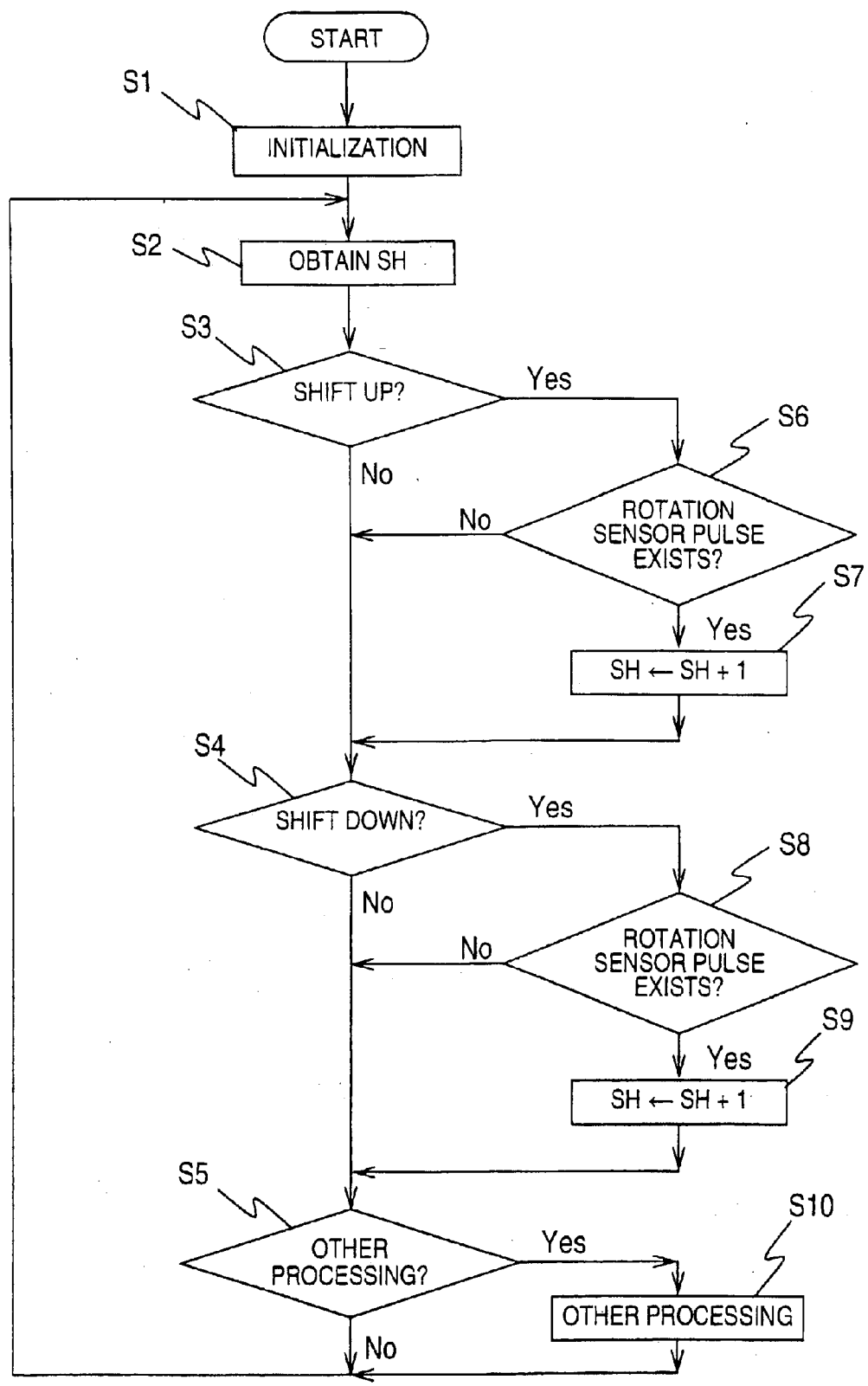
FIG. 8 is a flow chart describing the control operation of the rotation direction detection apparatus in accordance with the embodiment of the present invention illustrated in FIGS. 1–7.

The rotation direction detection apparatus 60' is preferably used in the gear shift control method implemented by the gear shift control apparatus 15 as shown in FIG. 8. In other words, the rotation direction detection apparatus 60' and the rotation direction detection apparatus 60 operate in the same manner. Thus, the gear shift control method implemented by the gear shift control apparatus 15 is the same for both the first and second embodiments.

Other Embodiments

In the previous embodiments, a reed switch was used as the non-contact detection element or means, but an opto-electric switch or other device may be used as the non-contact detection element or means.

In the previous embodiments, the apparatus of the present invention was used in order to detect the direction of rotation of bicycle cranks, but the apparatus of the present invention can be utilized to detect the direction of rotation of any type of rotating body.

Figure 9:
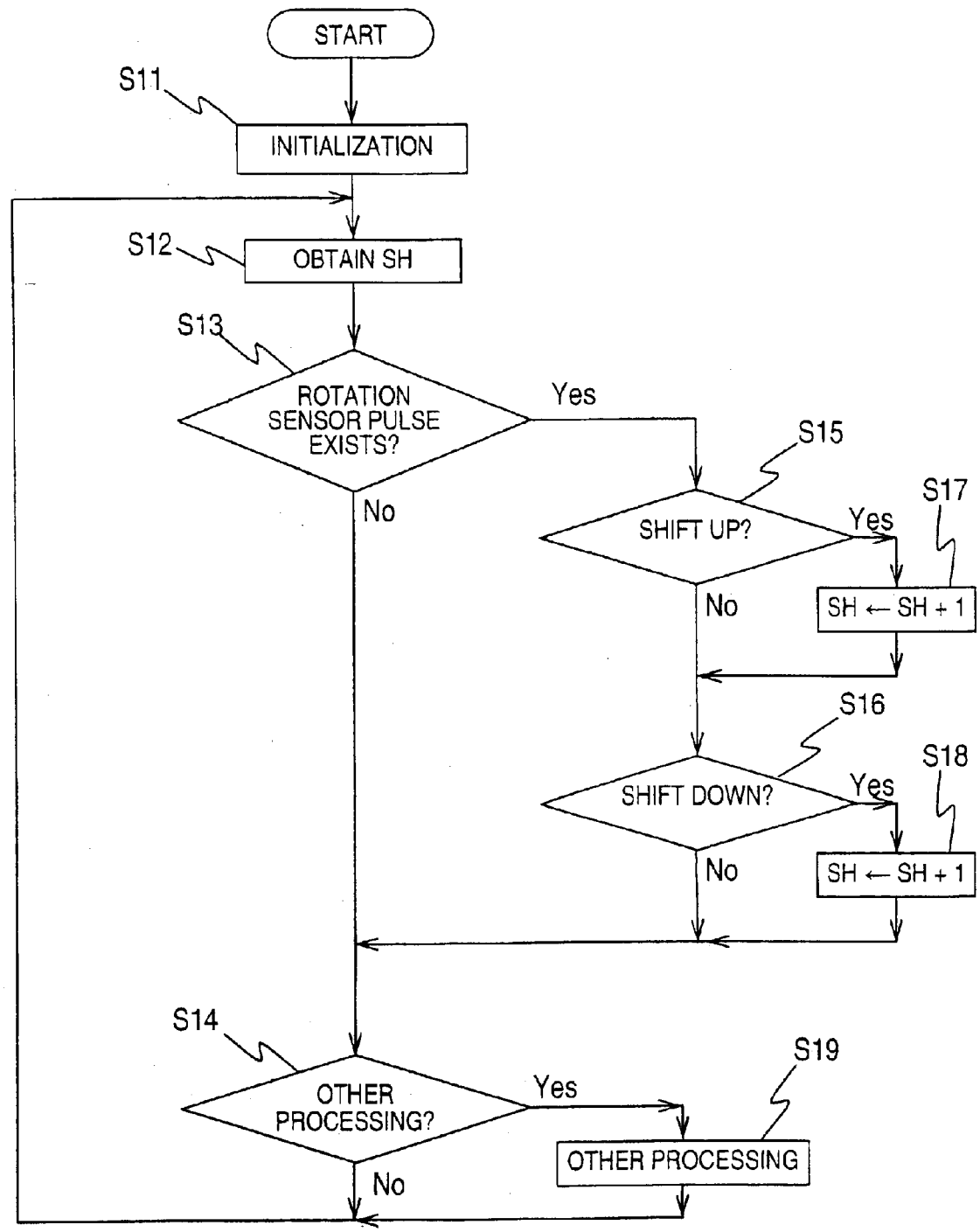
FIG. 9 is a flow chart, similar to FIG. 8, describing the control operation of a rotation direction detection apparatus in accordance another embodiment of the present invention.

In the previous embodiments, the direction of rotation was detected after a shift command was issued, but it is acceptable if the shift command is determined after the rotation direction is determined. In this case, it is acceptable if the direction of crank rotation is determined in step S13 and the shift-up command and shift-down command are determined in steps S15 and S16 only where the direction of crank rotation is the direction of forward motion (i.e., only where pulses are being emitted from the rotation sensor 29), as shown in FIG. 9.

According to the present invention, because the rotation of a rotating body in two directions can be detected via a single non-contact detection member by using a shielding member to enable and disable detection by the non-contact detection member, the detection apparatus can be realized using a compact and simple construction. Furthermore, because signals from only one non-contact detection member need be processed, detection of the direction of rotation of the rotating body can be detected using simple processing.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application is based on Japanese Patent Application No. 2001-323973. The entire disclosure of Japanese Patent Application No. 2001-323973 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A rotation direction detection apparatus comprising:
   a fixed unit;
   a rotating body;
   a detection member coupled to said fixed unit;
   a detection element coupled to said rotating body;
   a shielding member at least partially disposed between said rotating body and said detection member; and
   a linking member being configured and arranged between said rotating body and said shielding member to link said rotating body and said shielding member together via friction,
   said shielding member being configured and arranged to move between a shielding position where said detection member cannot detect said detection element and a detection position where said detection member can detect said detection element, said detection position being spaced from said shielding position,
   said shielding member being further configured and arranged to move in tandem with rotation of said rotating body in at least one of a first rotational direction and a second rotational direction that is opposite the first rotational direction.

2. The rotation direction detection apparatus according to claim 1, wherein
   said fixed unit is a bicycle component, and said rotating body is configured rotate in tandem with a crank of a bicycle.

3. The rotation direction detection apparatus according to claim 2, wherein
   said detection element includes a magnet, and said detection member includes a reed switch that is switched between an ON position and an OFF position via a magnetic force from said magnet.

4. The rotation direction detection apparatus according to claim 3, wherein said shielding member is configured to shield the magnetic force emitted by said magnet.

5. The rotation direction detection apparatus according to claim 4, wherein
   said shielding member is mounted to rotate around a rotational axis of said rotating body via friction.

6. The rotation direction detection apparatus according to claim 5, further comprising
   a positioning member being configured and arranged between said shielding member and said fixed unit to selectively hold said shielding member in one of said shielding position and said detection position.

7. The rotation direction detection apparatus according to claim 6, wherein
   said positioning member comprises a stopper member configured and arranged on said fixed unit to selectively position said shielding member in one of said shielding position and said detection position.

8. The rotation direction detection apparatus according to claim 1, wherein
   said detection member is a reed switch that is switched between an ON position and and OFF position via magnetic force and said detection element is a magnet.

9. The rotation direction detection apparatus according to claim 1, wherein
   said shielding member is mounted to rotate around a rotational axis of said rotating body via friction.

10. The rotation direction detection apparatus according to claim 1, further comprising
    a positioning member being configured and arranged between said shielding member and said fixed unit to selectively hold said shielding member in one of said shielding position and said detection position.

11. The rotation direction detection apparatus according to claim 1, wherein
    said fixed unit is a chain guide, and said rotating body is a pulley.

12. A rear derailleur comprising:
    a base member configured to be coupled to a bicycle frame;
    a movable member movably coupled relative to said base member;
    a linking mechanism operatively coupled between said base member and said movable member;
    a chain guide movably coupled to said movable member; and
    upper and lower pulleys rotatably coupled to said chain guide;
    a detection element coupled to one of said upper and lower pulleys;
    a detection member coupled to said chain guide; and
    a shielding member at least partially disposed between said rotating body and said detection member;
    said shielding member being configured and arranged to move between a shielding position where said detection member cannot detect said detection element and a detection position where said detection member can detect said detection element, said detection position being spaced from said shielding position,
    said shielding member being further configured and arranged to move in tandem with said one of said upper and lower pulleys having said detection element coupled thereto in at least one of a first rotational direction and a second rotational direction that is opposite the first rotational direction.

13. The rear derailleur according to claim 12, wherein said detection element includes a magnet, said detection member includes a reed switch that is switched between an ON position and an OFF position via a magnetic force from said magnet; and said shielding member is configured to shield the magnetic force emitted by said magnet.

14. The rear derailleur according to claim 12, wherein said shielding member is mounted to rotate around a rotational axis of said one of said upper and lower pulleys via friction.

15. The rear derailleur according to claim 12, further comprising
a positioning member being configured and arranged between said shielding member and said chain guide to selectively hold said shielding member in one of said shielding position and said detection position.

16. The rear derailleur according to claim 12, further comprising
a linking member being configured and arranged between said one of said upper and lower pulleys and said shielding member to link said one of said upper and lower pulleys and said shielding member together via friction.

17. The rear derailleur according to claim 12, wherein said detection element is coupled to said lower pulley.

18. The rear derailleur according to claim 12, wherein said detection element is coupled to said upper pulley.

* * * * *